United States Patent
Hauser et al.

(10) Patent No.: US 9,772,111 B2
(45) Date of Patent: Sep. 26, 2017

(54) METHOD FOR REPLACING A SWIRLER

(71) Applicant: SIEMENS AKTIENGESELLSCHAFT, München (DE)

(72) Inventors: Thomas Hauser, Hönow (DE); Peter Möllenbeck, Berlin Tempelhof-Schöneberg (DE); Karsten Von Schwander, Panketal (DE)

(73) Assignee: SIEMENS AKTIENGESELLSCHAFT (DE)

( * ) Notice: Subject to any disclaimer, the term of this patent is extended or adjusted under 35 U.S.C. 154(b) by 315 days.

(21) Appl. No.: 14/672,649

(22) Filed: Mar. 30, 2015

(65) Prior Publication Data

US 2015/0276224 A1    Oct. 1, 2015

(30) Foreign Application Priority Data

Mar. 31, 2014 (EP) .................................. 14162677

(51) Int. Cl.
| | |
|---|---|
| *B23P 6/00* | (2006.01) |
| *F23R 3/26* | (2006.01) |
| *B23K 31/02* | (2006.01) |
| *F23R 3/14* | (2006.01) |
| *F23R 3/28* | (2006.01) |

(52) U.S. Cl.
CPC ............ *F23R 3/26* (2013.01); *B23K 31/02* (2013.01); *B23P 6/00* (2013.01); *F23R 3/14* (2013.01); *F23R 3/286* (2013.01); *F23R 2900/00017* (2013.01); *F23R 2900/00019* (2013.01); *Y10T 29/4973* (2015.01)

(58) Field of Classification Search
CPC .. B23P 6/00; B23P 6/007; B23P 6/005; B23P 6/002; B23P 2700/13; B23P 15/008; Y10T 29/49742; Y10T 29/49737; Y10T 29/4973; Y10T 29/49346; Y10T 29/49348; F23R 3/26; F23R 2900/00019; F23R 2900/00017; F23R 3/286; F23R 3/14; F23R 3/343
See application file for complete search history.

(56) References Cited

U.S. PATENT DOCUMENTS

| | | |
|---|---|---|
| 2010/0330521 A1 | 12/2010 | Krieger et al. |
| 2011/0000216 A1 | 1/2011 | Imamura et al. |

FOREIGN PATENT DOCUMENTS

| | | |
|---|---|---|
| EP | 2 085 695 A1 | 8/2009 |
| EP | 2 273 197 A2 | 1/2011 |
| EP | 2 397 763 A1 | 12/2011 |

OTHER PUBLICATIONS

European Search Report dated Sep. 8, 2014 issued in corresponding European patent application No. 14 16 2677.

*Primary Examiner* — Jermie Cozart
(74) *Attorney, Agent, or Firm* — Ostrolenk Faber LLP

(57) ABSTRACT

A method for replacing a swirler (2) of a premixing or main burner of a burner arrangement (1), wherein the swirler (2) is connected to a distributor flange plate (5) of the burner arrangement (1) via a fuel gas feed pipe (3) and a fuel oil feed line (4) accommodated therein. The fuel gas feed line and the fuel oil feed line are severed to enable removal of the separated end portion of the fuel gas feed line. A sleeve is installed to replace the removed end portion.

7 Claims, 4 Drawing Sheets

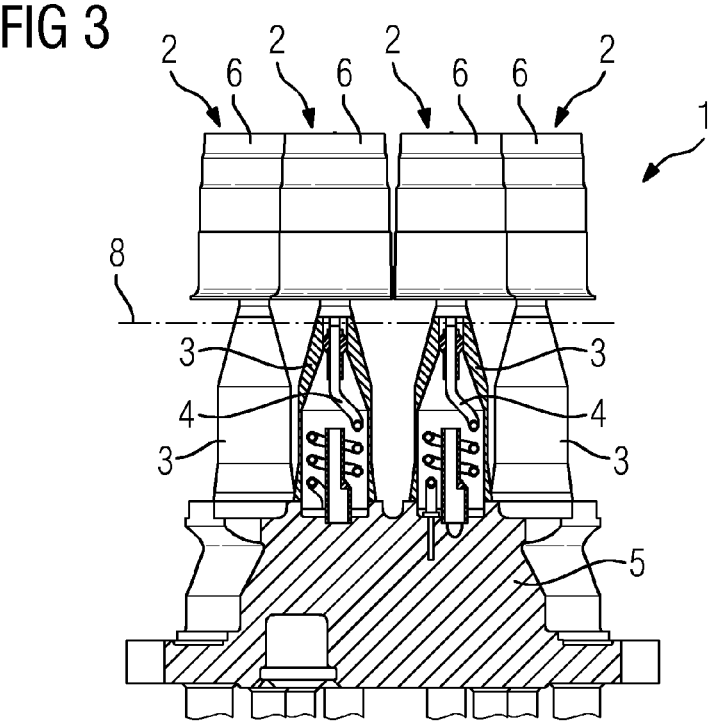
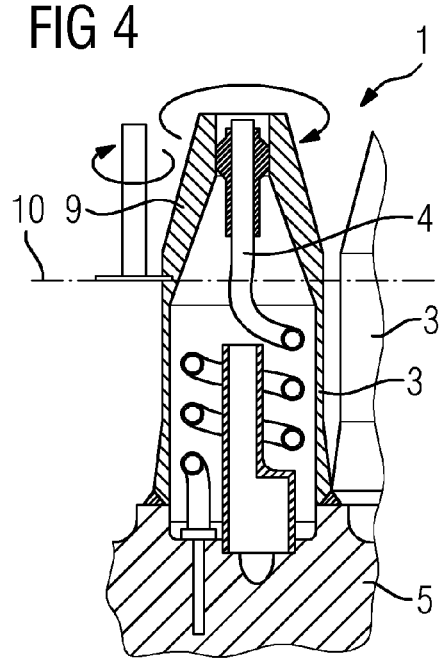
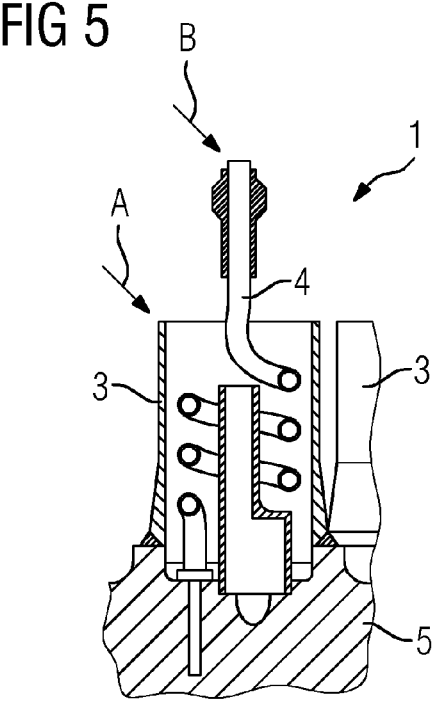

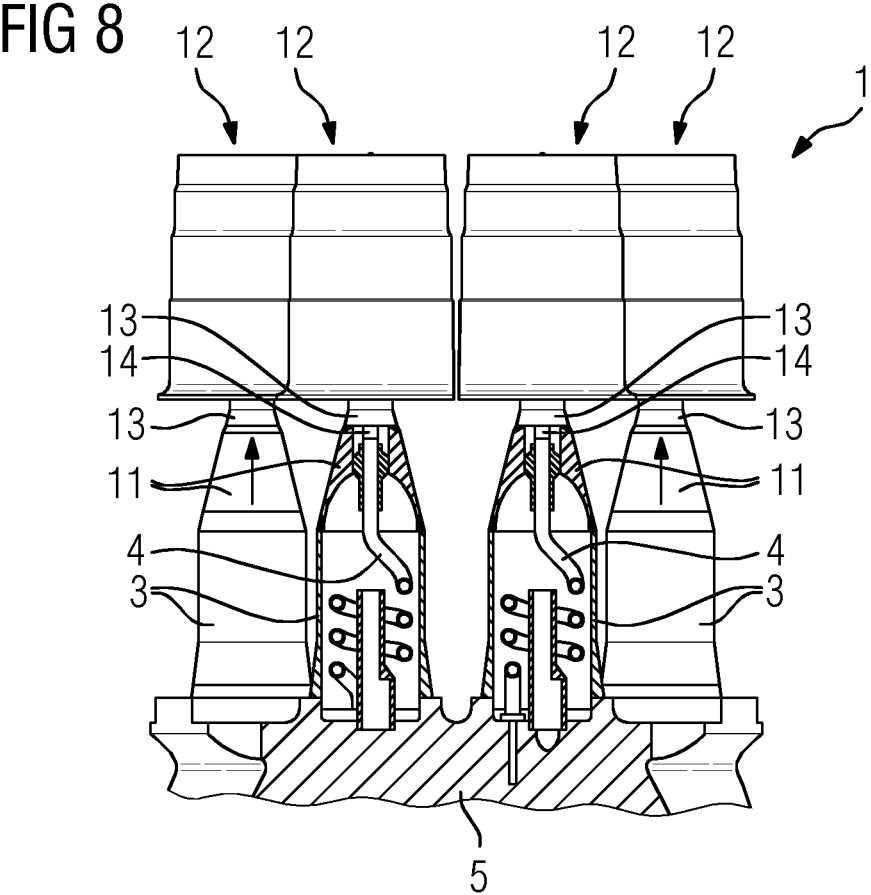

METHOD FOR REPLACING A SWIRLER

CROSS-REFERENCE TO RELATED APPLICATIONS

The present application claims priority of European Patent Application No. EP 14162677, filed Mar. 31, 2014, the contents of which are incorporated by reference herein.

TECHNICAL FIELD

The present invention relates to a method for replacing a swirler of a premixing or main burner of a burner arrangement, wherein the swirler is connected to a distributor flange plate of the burner arrangement via a fuel gas feed pipe and a fuel oil feed line accommodated therein.

TECHNICAL BACKGROUND

Swirlers of the type mentioned in the introduction are known in different configurations in the prior art. They serve to swirl the combustion air fed by a compressor and to mix it with the fuel which is fed via the fuel gas feed pipe and/or the fuel oil feed line. For this purpose, swirlers comprise an outer ring, which is arranged around the free end of the fuel gas feed pipe and, together with the latter, defines an annular flow duct for the compressed combustion air. Swirlers furthermore comprise swirler blades which extend between the gas feed pipe and the outer ring and which swirl the combustion air. The flow duct is connected via corresponding connection ducts to the fuel gas feed pipe on the one hand and the fuel oil feed line on the other hand, such that the respective fuel can be injected into the flow duct.

The replacement of a damaged swirler is very time-consuming and costly in practice. In one known method, the fuel gas feed pipe and the fuel oil feed line accommodated therein are separated directly at the distributor flange plate on the hot side. The same applies to the entire fuel supply on the cold side of the distributor flange plate. Then, the arrangement is reconstructed anew, with merely the distributor flange plate being reused. All of the other components are replaced by new parts.

SUMMARY OF THE INVENTION

Proceeding from this prior art, it is an object of the present invention to provide an alternative method of the type mentioned in the introduction which can be carried out with a moderate amount of time and costs.

To achieve this object, the present invention provides a method of the type mentioned in the introduction which comprises the following steps:
a) separating the swirler by severing the fuel gas feed pipe and the fuel oil feed line along a first parting plane close to the swirler;
b) removing the separated swirler;
c) separating an end portion of the remaining fuel gas feed pipe by severing the remaining fuel gas feed pipe along a second parting plane, without severing the fuel oil feed line in the process;
d) removing the separated end portion of the fuel gas feed pipe;
e) providing a sleeve, which replaces the end portion of the fuel gas feed pipe separated in step c) and which is formed in such a manner that it can be pushed at least partially onto the remaining fuel gas feed pipe or can be pushed into the latter;
f) arranging the sleeve on or in the remaining fuel gas feed pipe;
g) providing a new swirler, from which a new fuel gas feed pipe end portion and a new fuel oil feed line end portion protrude axially;
h) integrally connecting the remaining fuel oil feed line to the new fuel oil feed line end portion protruding from the new swirler;
i) arranging the sleeve between the remaining fuel gas feed pipe and the new fuel gas feed pipe end portion protruding from the new swirler; and
j) integrally connecting the sleeve to the remaining fuel gas feed pipe on the one hand and to the new fuel gas feed pipe end portion protruding axially from the new swirler on the other hand.

On account of the fact that the end portion of the fuel gas feed pipe separated in step c) is replaced by a sleeve which is displaceable telescopically in relation to the remaining fuel gas feed pipe, it is possible in successive steps to integrally connect firstly the new fuel oil feed line end portion of the new swirler to the remaining fuel oil feed line (step h) and then the sleeve to the remaining fuel gas feed pipe on the one hand and to the new fuel gas feed pipe end portion protruding axially from the new swirler on the other hand (step j). Accordingly, parts of the fuel gas feed pipe and parts of the fuel oil feed line can be reused for the replacement of a swirler, as a result of which the outlay and the costs associated with the replacement of a swirler according to the invention can be rendered moderate.

According to one configuration of the present invention, the end portion of the remaining fuel gas feed pipe separated in step c) and the sleeve which replaces it have the same length.

It is advantageous that the end portion of the remaining fuel gas feed pipe separated in step c) and the sleeve which replaces the separated fuel gas feed pipe end portion have a conical form.

It is preferable that the integral connections in steps h) and j) are produced by means of welding, since high-temperature-strength connections are produced in this way. Alternatively, however, it is also possible for other connection methods to be used, for example brazing, to name just one example.

It is advantageous that the weld seams produced in steps h) and j) are subjected beforehand to weld seam preparation. In other words, the regions to be welded are cleaned and if appropriate machined before the weld seams are produced, in order to ensure that correct weld seams are produced.

According to one configuration of the present invention, the new fuel oil feed line end portion protrudes from the new swirler further than the fuel oil feed line end portion protrudes from the separated swirler. It is thereby possible to avoid a situation in which the new welded connection is located in the region of an old weld seam; this can be associated with undesirable changes in material properties. Thus, by way of example, the new fuel oil feed line portion of the new swirler can protrude 2 to 5 mm further than the fuel oil feed line end portion of the separated swirler.

Further features and advantages of the present invention will become clear from the following description of an embodiment of a method according to the invention with reference to the accompanying drawing. In the drawing:

BRIEF DESCRIPTION OF THE DRAWINGS

FIGS. 3 to 8 are partial views of the arrangement shown in FIGS. 1 and 2, on the basis of which individual method steps of a method according to one embodiment of the present invention will be explained.

DESCRIPTION OF AN EMBODIMENT

Figure 1:
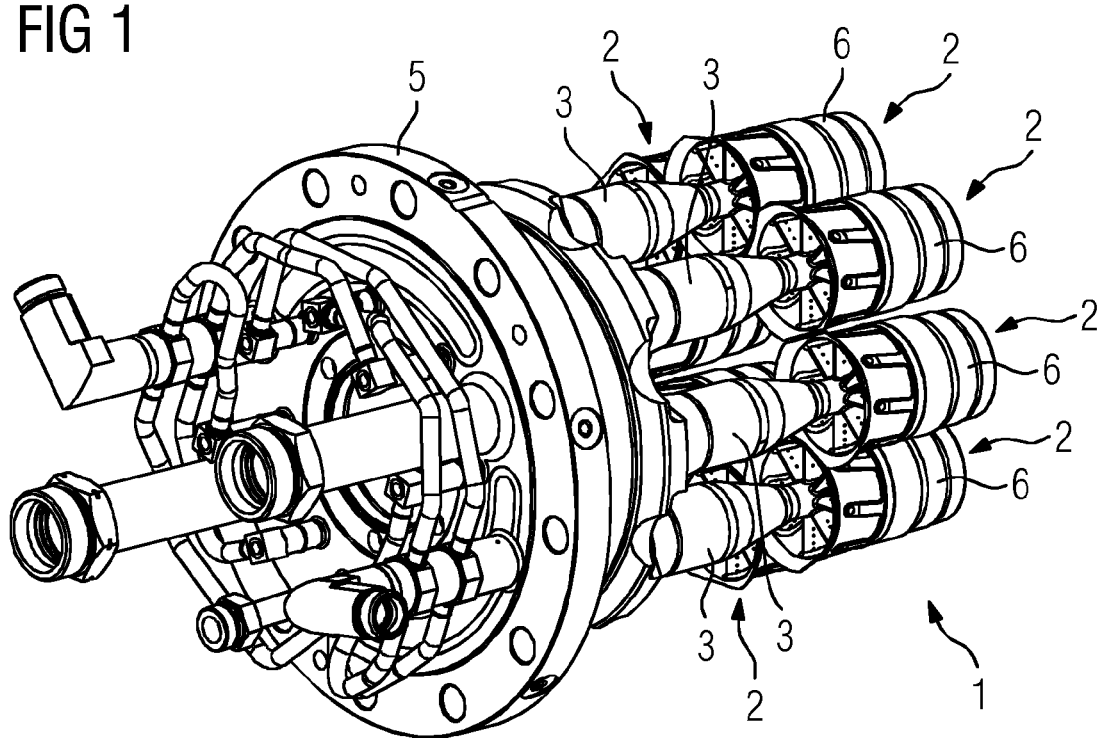
FIG. 1 is a perspective view of a burner arrangement having a plurality of swirlers.
Figure 2:
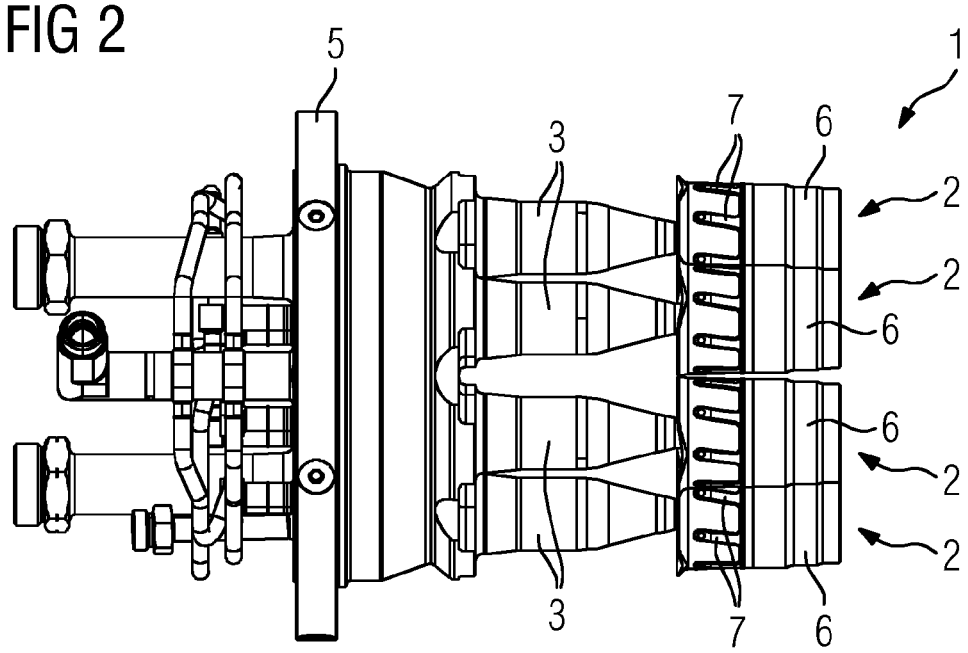
FIG. 2 is a side view of the burner arrangement shown in FIG. 1.

FIGS. 1 and 2 show a gas turbine burner arrangement 1 having a plurality of swirlers 2, each swirler 2 representing a component of a premixing or main burner. Each swirler 2 is connected via a fuel gas feed pipe 3 and a fuel oil feed line 4 accommodated therein to a distributor flange plate 5, via which the gas turbine burner arrangement 1 is flanged onto a gas turbine housing (not shown in more detail). The fuel gas feed pipes 3 and the fuel oil feed lines 4 are connected in a known manner via the distributor flange plate 5 to a fuel gas feed on the one hand and a fuel oil feed on the other hand, not further detailed herein. The swirlers 2 each comprise an outer ring 6, which surrounds the free end of the associated fuel gas feed pipe 3 in such a manner that an annular flow duct is defined between the fuel gas feed pipe 3 and the outer ring 6. Furthermore, each swirler 2 comprises a plurality of swirler blades 7, which each extend between the fuel gas feed pipe 3 and the outer ring 6. Even if it is not shown in the figures, both the fuel gas feed pipes 3 and the fuel oil supply lines 4 are connected to the annular flow duct by corresponding connection ducts, such that fuel oil and/or fuel gas can optionally be injected into the flow duct. During operation of the gas turbine, compressed combustion air is conducted through the individual flow ducts of the respective swirlers 2, swirled by the swirler blades 7 and mixed with fuel oil and/or fuel gas.

The swirlers 2 which have been damaged during operation of the gas turbine have to be replaced by new swirlers in the course of maintenance or repair work. For this purpose, according to one embodiment of a method according to the invention, a plurality of steps are carried out, as described hereinbelow with reference to FIGS. 3 to 8:

In a first step, a swirler 2 to be replaced is separated by severing the associated fuel gas feed pipe 3 and the fuel oil feed line 4 accommodated therein along a first parting plane 8, as is shown in FIG. 3. The separating cut can be made, for example, using an erosion method.

In a further step, the separated swirler 2 is removed, as a result of which the arrangement shown in FIG. 4 is obtained. After the separated swirler 2 has been removed, in a further step a conically tapering end portion 9 of the remaining fuel gas feed pipe 3 is separated by severing the remaining fuel gas feed pipe 3 along a second parting plane 10, without severing the internal fuel oil feed line 4 in the process. By way of example, the end portion 9 can be separated using a cutting method, for example severing by means of a cutting disk or the like.

The separated end portion 9 of the fuel gas feed pipe 3 is then removed, such that the arrangement shown in FIG. 5 is obtained. Then, the surfaces which are denoted by the arrows A and B are subjected to weld seam preparation, i.e. they are cleaned and if appropriate machined.

Figure 6:
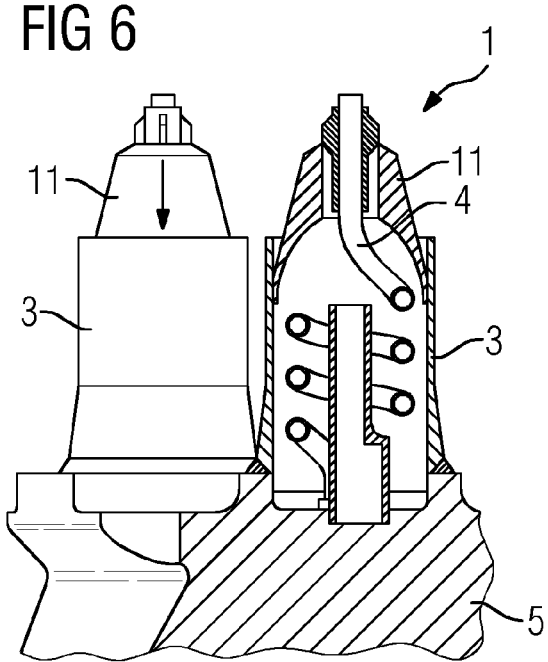

In a further step, provision is made of a sleeve 11, which replaces the separated end portion 9 of the fuel gas feed pipe 3 and which is formed in such a manner that it can be pushed at least partially into the remaining fuel gas feed pipe 3, as is shown in FIG. 6. The height and the internal dimensions of the sleeve 11 correspond substantially to the height and the internal dimensions of the separated end portion 9 of the fuel gas feed pipe 3, such that during the later operation of the gas turbine the sleeve 11 replaces the separated end portion 9 of the fuel gas feed pipe 3 without functional losses.

In a further step, the sleeve 11, as is shown in FIG. 6, is pushed into the remaining fuel gas feed pipe 3 in such a manner that the remaining fuel oil feed line 4 protrudes upward from the sleeve 11.

Then, provision is made of a new swirler 12, from which a new fuel gas feed pipe end portion 13 and a new fuel oil feed line end portion 14 protrude axially. In principle, the new swirler 12 has the same structure as the previously separated swirler 2. Merely the fuel oil supply line end portion 14 protrudes slightly further from the new fuel oil supply pipe end portion 13, for example by a measure of between 2 and 5 mm.

Figure 7:
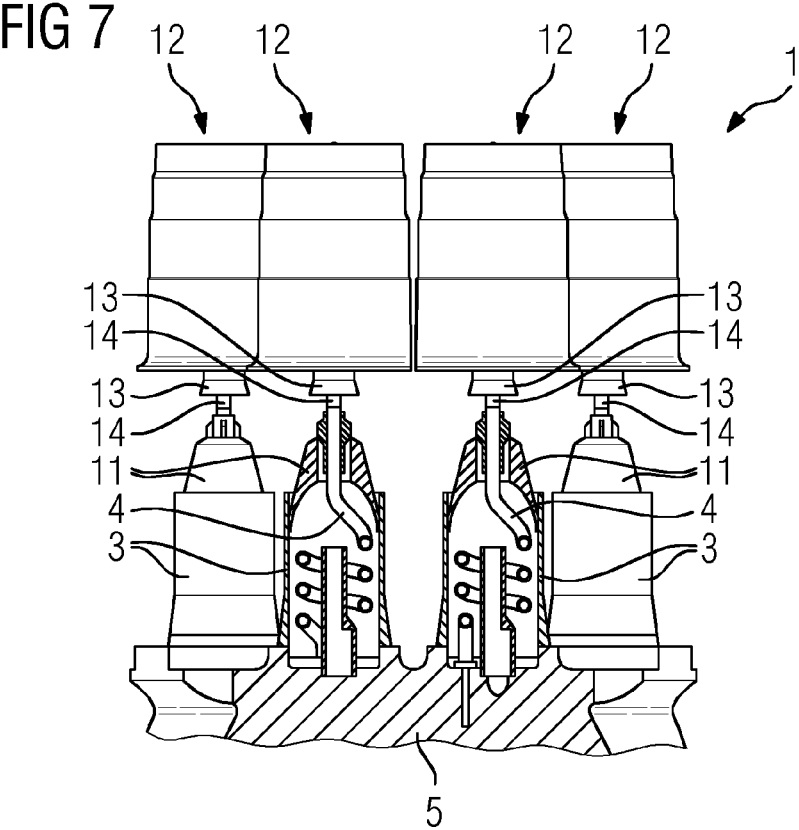

Then, the remaining fuel oil supply line 4 is integrally connected to the new fuel oil supply line end portion 14 protruding from the new swirler 12, as is shown in FIG. 7, for which purpose a welding method is used in the present case.

In a further step, as shown in FIG. 8, the sleeve 11 is arranged between the remaining fuel gas feed pipe 3 and the new fuel gas feed pipe end portion 13 protruding from the new swirler 12, and is then integrally connected to the remaining fuel gas feed pipe 3 on the one hand and to the new fuel gas feed pipe end portion 13 protruding axially from the new swirler 12 on the other hand. For this purpose, too, use is made in turn of a welding method.

A significant advantage of the method according to the invention consists in the fact that only the swirler itself and an end portion of the fuel gas feed pipe have to be replaced in the course of a swirler repair. Complete reconstruction of a burner proceeding from the old distributor flange plate is not required. This makes the method according to the invention less time-consuming and costly.

Although the invention has been illustrated and described in greater detail by the preferred exemplary embodiment, the invention is not limited by the disclosed examples, and other variations can be derived therefrom by a person skilled in the art without departing from the scope of protection of the invention.

The invention claimed is:

1. A method for replacing a swirler of a premixing or main burner of a burner arrangement, wherein the swirler is connected to a distributor flange plate of the burner arrangement via a fuel gas feed pipe and a fuel oil feed line accommodated in the fuel gas feed pipe, the method comprising:
   a) separating the swirler by a first severing of both the fuel gas feed pipe and the fuel oil feed line close to the swirler;
   b) removing the separated swirler;
   c) separating an end portion of the remaining fuel gas feed pipe by a second severing of the remaining fuel gas feed pipe, without also severing the fuel oil feed line;
   d) removing the separated end portion of the fuel gas feed pipe;
   e) providing a sleeve which is configured to replace the end portion of the fuel gas feed pipe that was separated in step c), and the sleeve is configured to be pushed at least partially onto or into the remaining fuel gas feed pipe;
   f) arranging the sleeve respectively on or in the remaining fuel gas feed pipe;

g) providing a second swirler, from which a second fuel gas feed pipe end portion and a second fuel oil feed line end portion protrude axially;

h) integrally connecting a remaining un-severed part of the fuel oil feed line to the second fuel oil feed line end portion protruding from the second swirler;

i) arranging the sleeve between a remaining un-severed part of the fuel gas feed pipe and the second fuel gas feed pipe end portion protruding from the second swirler; and j) integrally connecting the sleeve to a remaining un-severed part of the fuel gas feed pipe on the one hand and to the second fuel gas feed pipe end portion protruding axially from the second swirler on the other hand.

2. The method as claimed in claim 1, wherein the end portion of the remaining fuel gas feed pipe separated in step c) and the sleeve which replaces the end portion of the remaining fuel gas feed pipe have the same length.

3. The method as claimed in claim 1, wherein the end portion of the remaining fuel gas feed pipe separated in step c) and the sleeve which replaces the end portion of the remaining fuel gas feed pipe have a conical form.

4. The method as claimed in claim 1, further comprising welding to produce the integral connections in steps h) and j).

5. The method as claimed in claim 4, further comprising, before the weld seams are produced in steps h) and j), subjecting those weld seams to weld seam preparation.

6. The method as claimed in claim 1, wherein the second fuel oil feed line end portion is configured to protrude from the second swirler further than the fuel oil feed line end portion protrudes from the separated swirler.

7. The method as claimed in claim 1, wherein the separating of the swirler is along a first parting plane and the separating of the end portion is along a second parting plane.

* * * * *